US012621048B2

(12) United States Patent
Kim et al.

(10) Patent No.: US 12,621,048 B2
(45) Date of Patent: May 5, 2026

(54) METHOD FOR MATCHING BETWEEN HAP AND UAV IN SPACE-AIR-GROUND INTEGRATED NETWORK, RECORDING MEDIUM AND DEVICE FOR PERFORMING THE METHOD

(71) Applicant: Korea University Research and Business Foundation, Seoul (KR)

(72) Inventors: Joongheon Kim, Seoul (KR); Soyi Jung, Seoul (KR); Hyunsoo Lee, Seoul (KR); Haemin Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 349 days.

(21) Appl. No.: 18/138,852

(22) Filed: Apr. 25, 2023

(65) Prior Publication Data

US 2023/0353235 A1 Nov. 2, 2023

(30) Foreign Application Priority Data

Apr. 29, 2022 (KR) ........................ 10-2022-0053626

(51) Int. Cl.
*H04B 7/185* (2006.01)

(52) U.S. Cl.
CPC ..... *H04B 7/18539* (2013.01); *H04B 7/18504* (2013.01)

(58) Field of Classification Search
CPC ............ H04B 7/18504; H04B 7/18508; H04B 10/118; H04B 7/18502; H04B 7/18539;
(Continued)

(56) References Cited

U.S. PATENT DOCUMENTS

| | | | |
|---|---|---|---|
| 11,979,188 B2 * | 5/2024 | Faulkner | H04B 10/294 |
| 2017/0163336 A1 * | 6/2017 | Jalali | H04W 16/28 |

(Continued)

FOREIGN PATENT DOCUMENTS

| | | |
|---|---|---|
| KR | 10-1988168 B1 | 6/2019 |
| KR | 10-2082452 B1 | 2/2020 |

(Continued)

OTHER PUBLICATIONS

Hamza, Doha, et al. "Multi-sided Matching for the Association of Space-Air-Ground Integrated Systems." arXiv preprint arXiv:2111. 09411 (2021). pp 1-7.

(Continued)

*Primary Examiner* — Khalid W Shaheed
(74) *Attorney, Agent, or Firm* — NSIP Law

(57) ABSTRACT

A method for matching between high altitude platform (HAP) and unmanned aerial vehicle (UAV) in space-air-ground integrated network includes determining if there is an unmatched UAV in the space-air-ground integrated network including at least one UAV and at least one HAP; requesting matching to an unmatched m-th (where m is a natural number) UAV from an n-th (where n is a natural number) HAP having an unconnected antenna in a presence of the unmatched UAV; determining if the m-th UAV is matched with another HAP; comparing a priority of the n-th HAP with a priority of the matched HAP, in case of the m-th UAV being matched with another HAP; and matching the unconnected antenna of the n-th HAP with the m-th UAV, in case of the priority of the n-th HAP being higher than the priority of the matched HAP.

15 Claims, 6 Drawing Sheets

1

(58) Field of Classification Search
CPC ... H04B 7/185; H04B 7/18506; H04W 84/06;
H04W 16/18; B64U 2201/104; B64U
2201/10; B64U 10/13; B64U 2101/20
See application file for complete search history.

(56) References Cited

U.S. PATENT DOCUMENTS

2022/0045747 A1* 2/2022 De Rosa ............ H04B 7/18506
2022/0136863 A1* 5/2022 Berggrund ............ G05D 1/042
701/33.1
2025/0220686 A1* 7/2025 Ganesan ............... H04L 1/1854

FOREIGN PATENT DOCUMENTS

KR          10-2280484 B1      7/2021
KR          10-2419238 B1      7/2022

OTHER PUBLICATIONS

Lee, Hyunsoo, et al. "Stable Marriage Matching for Traffic-Aware
Space-Air-Ground Integrated Networks: A Gale-Shapley Algorith-
mic Approach." *2022 International Conference on Information
Networking (ICOIN)*. IEEE, 2022. pp. 474-477.

* cited by examiner

1

Cloud Server

Satellite

HAP

UAV

Ground

Computing communication
Matching connection
Intra-segment link
Inter-segment link <u>10</u>

METHOD FOR MATCHING BETWEEN HAP AND UAV IN SPACE-AIR-GROUND INTEGRATED NETWORK, RECORDING MEDIUM AND DEVICE FOR PERFORMING THE METHOD

CROSS-REFERENCE TO RELATED APPLICATION

This application claims priority to Korean Patent Application No. 10-2022-0053626, filed on Apr. 29, 2022, and all the benefits accruing therefrom under 35 U.S.C. § 119, the contents of which in its entirety are herein incorporated by reference.

BACKGROUND

1. Field

The present disclosure relates to a method for matching between High Altitude Platform (HAP) and Unmanned Aerial Vehicle (UAV) in space-air-ground integrated network, a recording medium and a device for performing the method, and more particularly, to a traffic-aware stable matching scheme between HAP and UAV using the Gale-Shapley algorithm in space-air-ground integrated network.

2. Description of the Related Art

Space-Air-Ground Integrated networks (SAGIN) are infrastructures for use in the future mobile communication technology, 5G and B5G, through integration of the existing networks or addition of new layers, and many studies are being made on the integration of multilayer networks in many research institutes and industry sectors. Additionally, the international standards development organizations such as 3rd generation partnership project (3GPP) and International Telecommunication Union (ITU) are conducting standardization research.

Meanwhile, High Altitude Platform (HAP) is technology that enables bidirectional information communication from/to airship or aircraft carrying communication payloads in the air above regions where there is a demand for services, such as densely populated areas, disaster areas or the like. This technology can replace terrestrial networks in areas where it is impossible to install terrestrial networks or it takes a lot of cost to do so, and has not only wide area and broadband coverage of satellite communication but also high speed and low latency of terrestrial communication.

RELATED LITERATURES

Patent Literature (Patent Literature 0001) KR 10-2021-0064032 A
(Patent Literature 0002) KR 10-2280484 B1

Non-Patent Literature (Non-Patent Literature 0001) H. Lee, H. Lee, S. Jung and J. Kim, "Stable Marriage Matching for Traffic-Aware Space-Air-Ground Integrated Networks: A Gale-Shapley Algorithmic Approach," 2022 International Conference on Information Networking (ICOIN), 2022, pp. 474-477, doi: 10.1109/ICOIN53446.2022.9687261.

SUMMARY

The present disclosure is designed to solve the above-described problem, and therefore the present disclosure is directed to providing a method for matching between High Altitude Platform (HAP) and Unmanned Aerial Vehicle (UAV) in space-air-ground integrated network.

The present disclosure is further directed to providing a recording medium having recorded thereon a computer program for performing the method for matching between HAP and UAV in space-air-ground integrated network.

The present disclosure is further directed to providing a device for performing the method for matching between HAP and UAV in space-air-ground integrated network.

To achieve the above-described objective of the present disclosure, a method for matching between HAP and UAV in space-air-ground integrated network according to an embodiment includes determining if there is an unmatched UAV in the space-air-ground integrated network including at least one UAV and at least one HAP; requesting matching to an unmatched m-th (where m is a natural number) UAV from an n-th (where n is a natural number) HAP having an unconnected antenna in a presence of the unmatched UAV; determining if the m-th UAV is matched with another HAP; comparing a priority of the n-th HAP with a priority of the matched HAP, in case of the m-th UAV being matched with another HAP; and matching the unconnected antenna of the n-th HAP with the m-th UAV, in case of the priority of the n-th HAP being higher than the priority of the matched HAP.

In an embodiment of the present disclosure, the method for matching between HAP and UAV in space-air-ground integrated network may include repeatedly performing the steps until there is no unmatched UAV.

In an embodiment of the present disclosure, the method for matching between HAP and UAV in space-air-ground integrated network may include terminating the steps upon completion of the matching of all the UAVs.

In an embodiment of the present disclosure, the method for matching between HAP and UAV in space-air-ground integrated network may further include matching the unconnected antenna of the n-th HAP with the m-th UAV, in case of the m-th UAV being not matched with another HAP.

In an embodiment of the present disclosure, the method for matching between HAP and UAV in space-air-ground integrated network may further include rejecting, by the m-th UAV, the matching of the n-th HAP, in case of the priority of the n-th HAP being equal to or lower than the priority of the matched HAP.

In an embodiment of the present disclosure, the matching of the n-th HAP with the m-th UAV may further include terminating, by the m-th UAV, the connection with the matched HAP, in case of the priority of the n-th HAP being higher than the priority of the matched HAP.

In an embodiment of the present disclosure, the priority may be set based on a path loss between the UAV and the HAP and a number of users served by the UAV.

To achieve another objective of the present disclosure, a computer-readable storage medium according to an embodiment has recorded thereon a computer program for performing the method for matching between HAP and UAV in space-air-ground integrated network.

To achieve still another objective of the present disclosure, a device for matching between HAP and UAV in space-air-ground integrated network according to an embodiment includes a UAV determination unit configured to determine if there is an unmatched UAV in the space-air-ground integrated network including at least one UAV and at least one HAP; a matching request unit configured to request matching to an unmatched m-th (where m is a natural number) UAV in a presence of the unmatched UAV; a matching determination unit configured to determine if the m-th UAV is matched with another HAP; a priority comparison unit configured to compare a priority of the HAP having requested the matching with a priority of the matched HAP, in case of the m-th UAV being matched with another HAP; and a matching completion unit configured to match an unconnected antenna of the HAP having requested the matching with the m-th UAV, in case of the priority of the HAP having requested the matching being higher than the priority of the matched HAP.

According to the method for matching between HAP and UAV in space-air-ground integrated network, it is possible to achieve network optimization through optimal matching between HAP and UAV based on priority using the Gale-Shapley algorithm.

DETAILED DESCRIPTION

Figure 1:
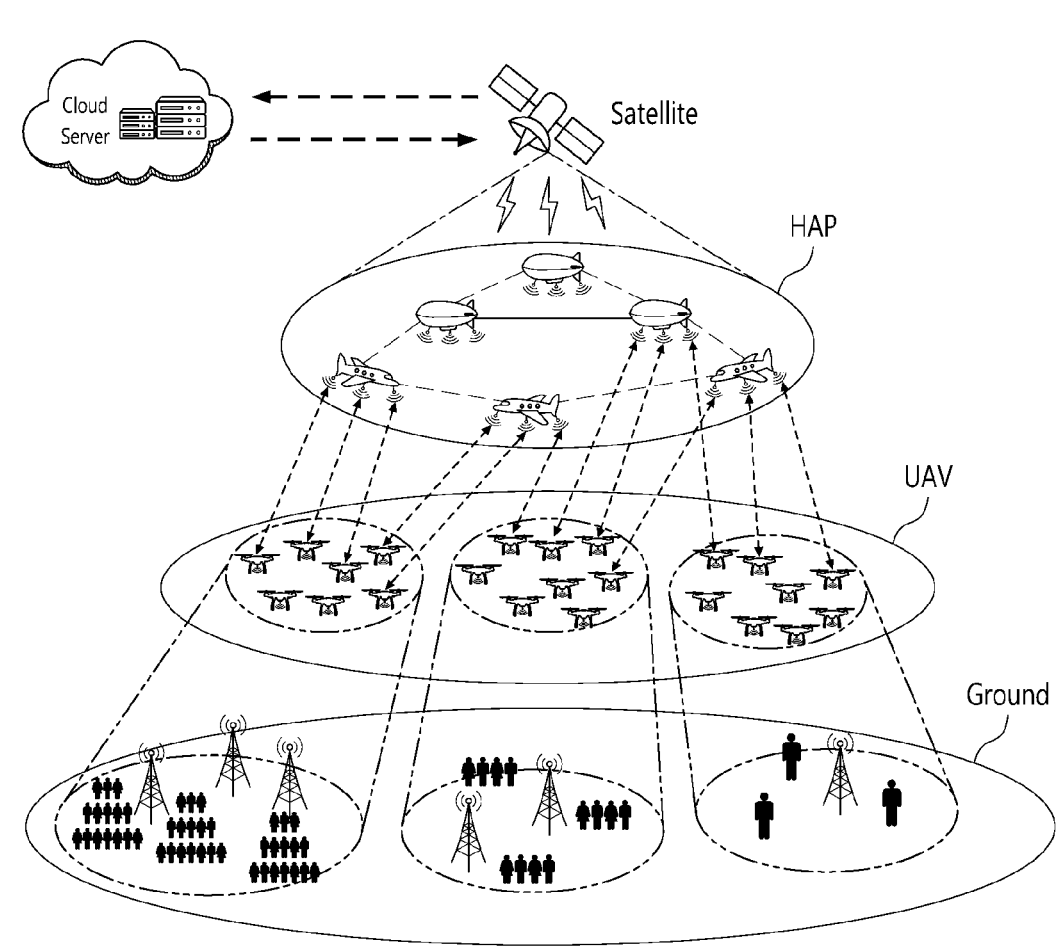
FIG. 1 is a diagram illustrating an exemplary space-air-ground integrated network scenario including High Altitude Platform (HAP) and Unmanned Aerial Vehicle (UAV) used in the present disclosure.

The following detailed description of the present disclosure is made with reference to the accompanying drawings showing particular embodiments of the present disclosure for illustrative purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be implemented in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, preferred embodiments of the present disclosure will be described in more detail with reference to the accompanying drawings.

FIG. 1 is a diagram showing an exemplary space-air-ground integrated network scenario including High Altitude Platform (hereinafter, HAP) and Unmanned Aerial Vehicle (hereinafter, UAV) used in the present disclosure.

With the rapid development of 5G and B5G (Beyond 5G) communication technology, not only radio propagation methods but also sophisticated communication frameworks such as Space-Air-Ground Integrated network (SAGIN) have emerged.

The present disclosure provides a method for optimal matching between HAP and UAV to provide services to as many ground users as possible in space-air-ground integrated network.

Referring to FIG. 1, the space-air-ground integrated network 1 includes multiple UAVs and multiple HAPs. Additionally, UAV may provide a relay network service to user equipment (UE) on the ground, and Low Earth Orbit (LEO) satellite may perform computer communication with a cloud server.

With the rapid development of the communication technology, next-generation communication systems require new communication structures. In particular, many studies are being made to make use of HAPs or UAVs in the existing terrestrial networks.

In an embodiment, the present disclosure proposes a method for matching between HAP and UAV using the Gale-Shapley algorithm (GSA) in relay communication. The Gale-Shapley algorithm is an economic matching theory proposed in 1962, and is a matching method that can always guarantee stable matching in a situation where priority is set on two sides of matching. The present disclosure can achieve smooth matching between elements in a layer by using the Gale-Shapley algorithm.

The next-generation networks including HAPs and UAVs are less costly than constructing new terrestrial infrastructure and have the potential to support higher data rate using millimeter-wave wireless communications.

Meanwhile, there are challenges for relay communication in space-air-ground integrated network due to fast mobility of UAV and a long distance between UAV and HAP.

Accordingly, it is essential to select UAV that will match HAP. In addition to considering the distance, HAP needs to provide services to as many users as possible on the ground to satisfy the ground users, so a method for finding optimal matching in a given environment is necessary.

The present disclosure applies the economic matching theory, the Gale-Shapley algorithm, for stable matching algorithm between HAP and UAV. The present disclosure always guarantees stable matching by applying the Gale-Shapley algorithm to find the optimal matching. Additionally, the present disclosure considers the path loss calculated from the distance and the number of ground users served by UAV.

In the space-air-ground integrated network, each UAV is connected to HAP and the HAP is also connected to the LEO satellite.

In the present disclosure, the set of UAVs is defined as $U=\{u_1, u_2, \ldots, u_m\}$, and the set of HAPs is defined as $H=\{h_1, h_2, \ldots, hm\}$. The UAV needs to be matched with the HAP's antenna, and the HAP's antenna is defined as $H^i=$ $$\{h_1^1, h_1^2, \ldots, h_n^i\}.$$

The matching $$M(h_n^i, u_m)$$

is defined as a match between the antenna of HAP $$h_n^i$$

and the UAV $u_m$.

The key notations used in the present disclosure are shown in the following Table 1.

TABLE 1

| Symbol | Description |
| --- | --- |
| U, H, M | The set of UAVs, HAPs and matchings |
| $h_n^i$ | The antenna of each HAP $h_n$ |
| $u_m$, $h_n$ | The specific UAV $u_m \in$ U, HAP $h_n \in$ H |
| $M(h_n^i, u_m)$ | The match between $h_n^i$ and $u_m$ |
| $f_c$ | Radio frequency between HAP and UAV |
| d | Distance between each HAP and UAV |

Basically, the path loss between UAV and HAP is measured as shown in the following Equation 1.

$$PL = PL_b + PL_g + PL_s \qquad \text{[Equation 1]}$$

Here, PL denotes the total path loss (dB), $PL_b$ denotes the basic path loss (dB), and $PL_g$ denotes the attenuation due to atmospheric gasses (dB). For example, $PL_g$ may be set as 23 dB, and $PL_s$ may be set as the attenuation due to the ionospheric or tropospheric scintillation. For latitudes between ±20° and ±60°, $PL_s$=0.

The Free Space Path Loss (FSPL) over the distance d(km) and frequency $f_c$(GHz) is defined as shown in the following Equation 2.

$$FSPL(d, f_c) = 92.45 + 20\log_{10}(f_c) + 20\log_{10}(d) \qquad \text{[Equation 2]}$$

The basic path loss (dB) is modeled as shown in the following Equation 3.

$$PL_b = FSPL(d, f_c) + SF + CL(\alpha, f_c) \qquad \text{[Equation 3]}$$

In the case of the exemplary scenario, non-line-of-sight (NLOS) shadow fading follows a Gaussian distribution with zero mean and variance 6, and clutter loss is about 25.5 dB.

Figure 2:
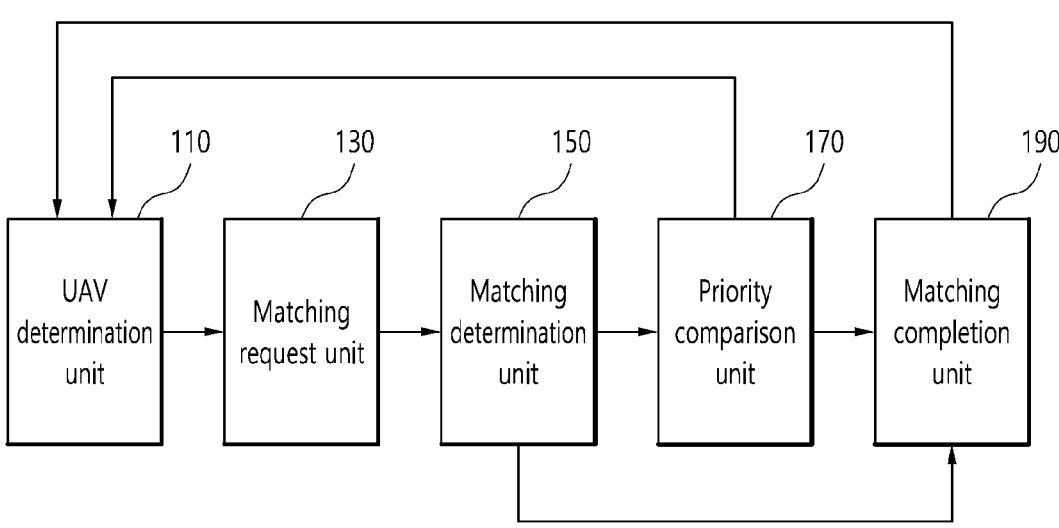
FIG. 2 is a block diagram of a device for matching between HAP and UAV in space-air-ground integrated network according to an embodiment of the present disclosure.

FIG. 2 is a block diagram of a device for matching between HAP and UAV in space-air-ground integrated network according to an embodiment of the present disclosure.

Referring to FIG. 2, the device 10 for matching between HAP and UAV in space-air-ground integrated network (hereinafter, the device) according to the present disclosure includes a UAV determination unit 110, a matching request unit 130, a matching determination unit 150, a priority comparison unit 170 and a matching completion unit 190.

The device 10 of the present disclosure may have and run software (an application) for matching between HAP and UAV in space-air-ground integrated network, and the UAV determination unit 110, the matching request unit 130, the matching determination unit 150, the priority comparison unit 170 and the matching completion unit 190 may be controlled by the software for matching between HAP and UAV in space-air-ground integrated network, running on the device 10.

The device 10 may be installed or included in the satellite or cloud server in the space-air-ground integrated network 1. Alternatively, the device 10 may be installed or included in each HAP.

The device 10 may be a separate terminal or module(s) of the terminal. Additionally, the UAV determination unit 110, the matching request unit 130, the matching determination unit 150, the priority comparison unit 170 and the matching completion unit 190 may be formed as an integrated module or at least one module. However, on the contrary, each component may be formed as a separate module.

The device 10 may be mobile or fixed. The device 10 may be in the form of a server or an engine, and may be interchangeably referred to as device, apparatus, terminal, user equipment (UE), mobile station (MS), wireless device and handheld device.

The device 10 may execute or create a variety of software based on an Operation System (OS), i.e., a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX and HP-UX.

The UAV determination unit 110 determines if there is any unmatched UAV in the space-air-ground integrated network 1, and when there is an unmatched UAV, the matching request unit 130 requests matching to an unmatched m-th (where m is a natural number) UAV.

The matching determination unit 150 determines if the m-th UAV is matched with another HAP, and when the m-th UAV is not matched with another HAP, matches the unconnected antenna of the n-th HAP with the m-th UAV.

When the m-th UAV is matched with another HAP, the priority comparison unit 170 compares the priority of the HAP having requested the matching with the priority of the matched HAP. The priority may be set based on the path loss between UAV and HAP and the number of users served by UAV.

When the priority of the HAP having requested the matching is higher than the priority of the matched HAP, the m-th UAV terminates the connection with the matched HAP, and the matching completion unit 190 matches the m-th UAV with the unconnected antenna of the HAP having requested the matching.

In contrast, when the priority of the n-th HAP is equal to or lower than the priority of the matched HAP, the m-th UAV rejects the matching of the n-th HAP.

The device 10 may repeatedly perform the matching until there is no unmatched UAV, and when all the UAVs are matched, may terminate the matching.

Figure 3:
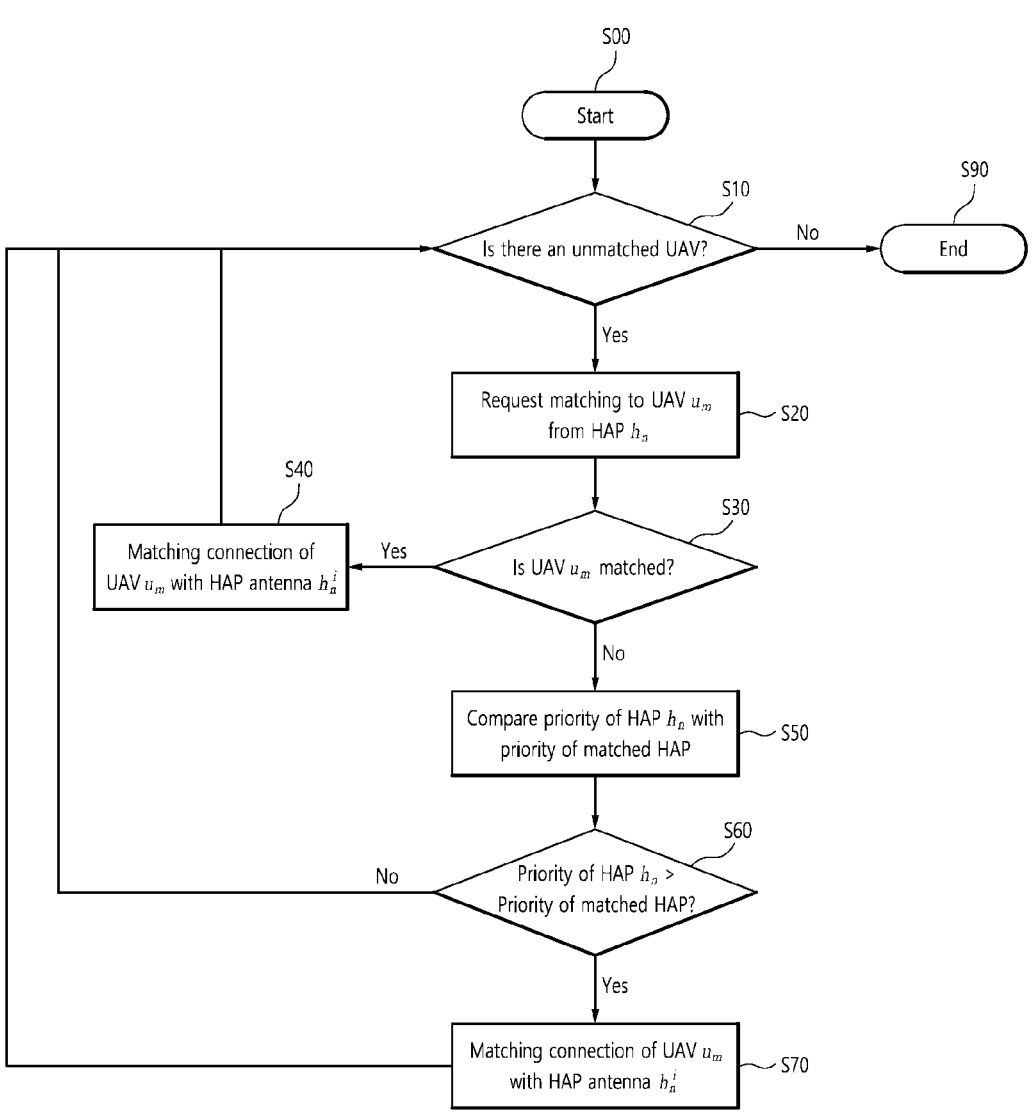
FIG. 3 is a flowchart of a method for matching between HAP and UAV in space-air-ground integrated network according to an embodiment of the present disclosure.

FIG. 3 is a flowchart of a method for matching between HAP and UAV in space-air-ground integrated network according to an embodiment of the present disclosure.

The method for matching between HAP and UAV in space-air-ground integrated network according to this embodiment may be performed in substantially the same configuration as the device 10 of FIG. 2 in the space-air-ground integrated network 1 environment of FIG. 1.

Accordingly, the same reference numerals are affixed to the same elements as the space-air-ground integrated network 1 of FIG. 1 and the device 10 of FIG. 2, and redundant descriptions are omitted. Additionally, the method for matching between HAP and UAV in space-air-ground integrated network according to this embodiment may be performed by the software (application) for matching between HAP and UAV in space-air-ground integrated network.

The present disclosure assumes that a channel between HAP and satellite is quasi-vacuum, and is almost an ideal channel with Additive White Gaussian Noise (AWGN).

To ensure smooth communication status, HAP and UAV need to maintain stable matching. The matching between AP and UAV follows the basic setting list according to two criteria.

In an embodiment, HAP may prefer UAV having relatively low path loss. Since a large amount of power is consumed when matching UAV far away from HAP, HAP selects nearby UAV.

Meanwhile, HAP may prefer matching with UAV that can provide services to a larger number of users. That is, HAP determines that it is more advantageous to connect to UAV that can provide services to ten devices than UAV that can provide services to one device.

Referring to FIG. 3, in the space-air-ground integrated network (step S00), when there is an unmatched UAV, the matching algorithm starts (step S10).

When there is an unmatched UAV, HAP $h_n$ having the unconnected antenna $$h_n^i$$

provides matching to UAV $u_m$ (step S20), and determines if UAV $u_m$ is matched with another HAP (step S30).

When UAV $u_m$ is not matched with another HAP, the matching $$h_n^i,$$

$u_m$ between HAP and UAV is created (step S40).

In contrast, when UAV is matched with another HAP (step S50), UAV $u_m$ compares the priority of HAP $h_n$ with the priority of the currently connected HAP $$h_n'$$

(step S60). When the priority of $$h_n'$$

is higher than the priority of $h_n$, the UAV rejects the offer of the new HAP $h_n$.

On the contrary, when the priority of the newly offered HAP $h_n$ is higher, UAV $u_m$ disconnects the current matching $$h_n'^i,$$

8

$u_m$ and matches with the newly offered HAP $h_n$ to build the new matching $$h_n^i,$$

$u_m$ (step S70). This process is repeated as long as there is an unmatched UAV, and when all the UAVs are matched, the process ends (step S90).

Assume that the environment of the present disclosure is, for example, 100 to 500 HAPs operating at the altitude of 18 to 22 km in an urban area and 500 to 2500 UAVs operating at the height of 50 to 350 m above the ground.

Each HAP has five antennas to connect to UAV. Accordingly, after the matching is completed, a maximum of 2500 matchings are created. The UAVs prefer HAPs that can connect to themselves at lower path loss, and the HAPs prefer UAVs having lower path loss themselves, as well as selecting UAVs that cover a larger number of users. These basic settings may be reflected in the basic setting list of the Gale-Shapley algorithm.

Figure 4:
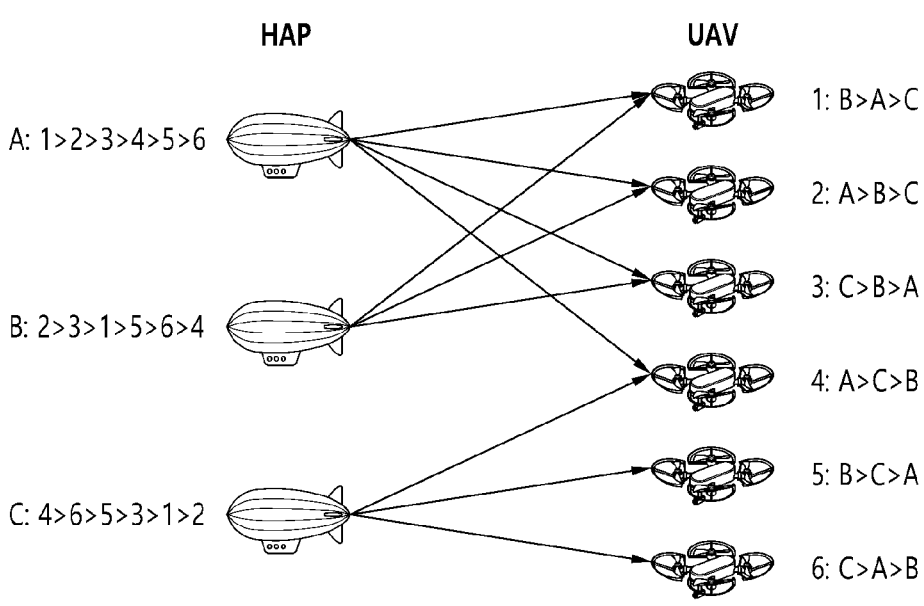
FIG. 4 is a diagram illustrating matching between HAP and UAV based on priority according to the present disclosure.

FIG. 4 is a diagram illustrating matching between HAP and UAV based on priority according to the present disclosure.

Referring to FIG. 4, assume that there are three HAPs, defined as HAP A, HAP B and HAP C from top, and there are six UAVs, defined as UAV 1, UAV 2, UAV 3, UAV 4, UAV 5 and UAV 6 from top.

In this embodiment, assume that each HAP may be connected to two UAVs, and each priority is the same as mentioned in FIG. 3.

First, HAP A offers matching to UAV 1 and UAV 2 having the highest priority, and since UAV 1 and UAV 2 are not yet matched, the two accept.

Subsequently, HAP B offers matching UAV 2 having the highest priority that has been already matched with HAP A. In this instance, UAV 2 rejects the matching of HAP B considering the priority of HAP A and the priority of HAP B. HAP B offers matching UAV 3 having the next highest priority, and after the matching is accepted, offers matching to UAV 1 again. Since UAV 1 prefers HAP B to HAP A, UAV 1 breaks the matching and connects to HAP B.

Subsequently, in the same way as HAP A, HAP C offers matching to two unpaired UAVs and the two accept.

In this instance, HAP A needs to be matched with at least one UAV. HAP A offers UAV 3 having the next highest priority, but since UAV 3 is already matched with HAP B having higher priority than HAP A, UAV 3 rejects the matching of HAP A.

Subsequently, HAP A offers matching to UAV 4, and since UAV 4 prefers HAP A the most, the matching is accepted.

Finally, HAP C offers matching to UAV 5, UAV 5 accepts the matching, and then the algorithm ends.

The present disclosure proposes a new score indicator to evaluate the algorithm, taking into account the path loss between UAV and HAP and the number of users served by UAV. The lower score indicates matching with UAV that has low path loss and serves a larger number of users.

The following description is the results of simulation performed to evaluate the possibility of supporting services for user equipment (UE) on the ground by matching between HAP and UAV using the Gale-Shapley algorithm according to the present disclosure.

Figure 5:
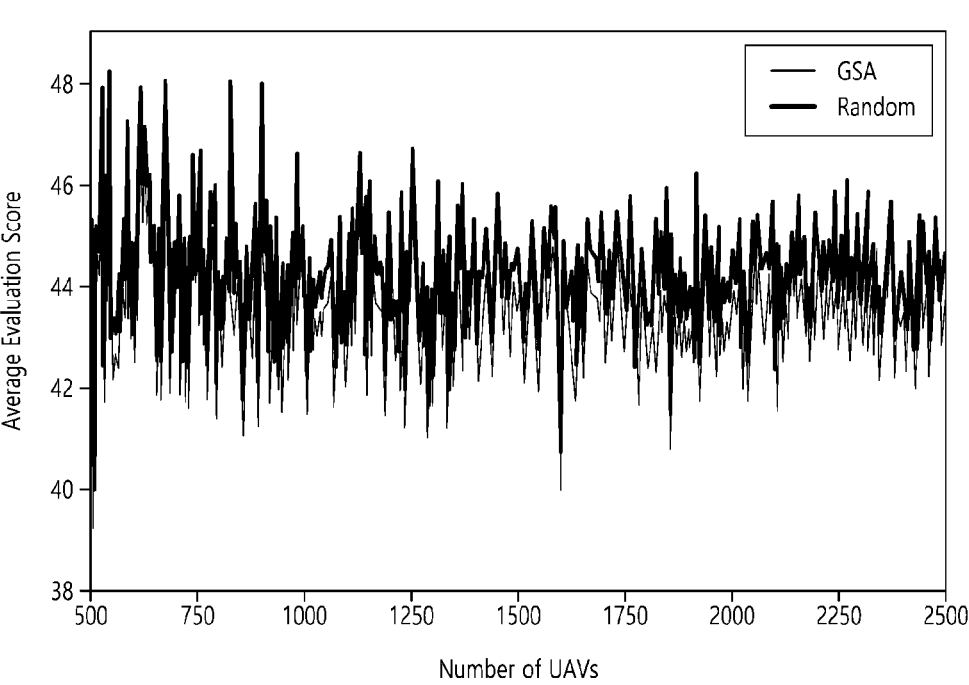
FIG. 5 is a graph showing an average score of random-based matching and a matching algorithm according to the present disclosure.

FIG. 5 is a graph showing an average score of random-based matching and the matching algorithm according to the present disclosure.

Referring to FIG. 5, HAPs floating in the air between 18 km and 22 km and UAVs flying in the range between 50 and 350 m are assumed. Under the assumption that each HAP is matched with five UAVs, FIG. 5 shows the results of simulation with the increasing number of HAPs from 1000 to 500 and the increasing number of UAVs from 500 to 2500.

In FIG. 5, the score is an evaluation indicator devised in the present disclosure, and the lower value, the higher matching quality. As a result, the matching algorithm according to the present disclosure shows higher performance than random matching, and it is found that the differences are constant over time.

That is, it is confirmed that the algorithm according to the present disclosure shows higher performance in all cases where matching is performed.

Figure 6:
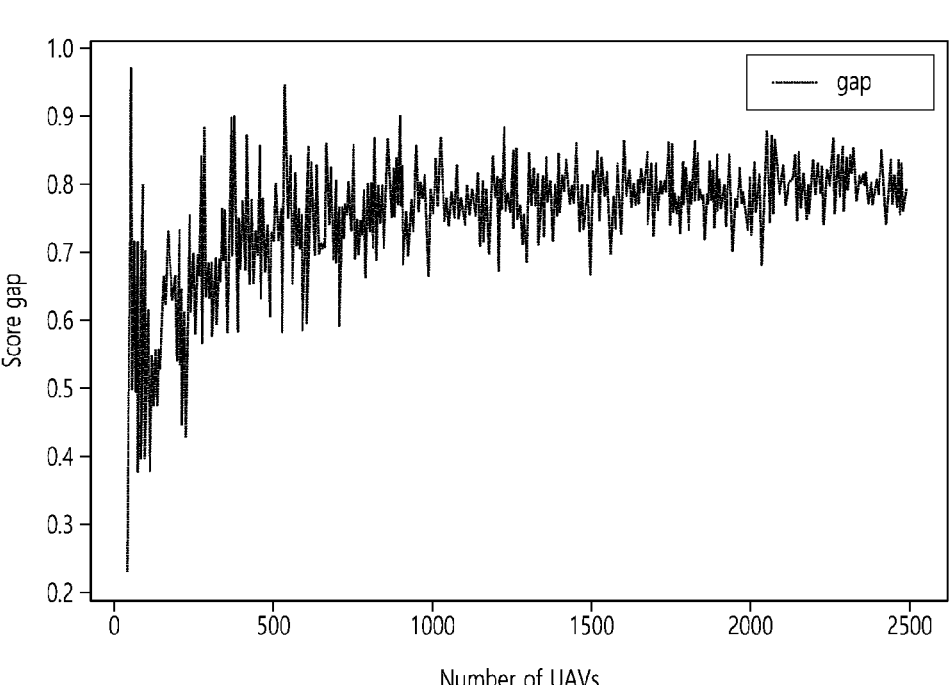
FIG. 6 is a graph showing a score gap between random-based matching and a matching algorithm according to the present disclosure.

FIG. 6 is a graph showing a score gap between random-based matching and the matching algorithm according to the present disclosure.

Referring to FIG. 6, as matching progresses, the algorithm according to the present disclosure shows stable and high performance compared to random matching.

The present disclosure performs matching using the Gale-Shapley algorithm when connecting HAP to UAV. Through the experimental results, it is confirmed that the present disclosure outperforms random matching and algorithms that only consider the distance.

That is, the numerical analysis results reveal that the present disclosure shows the outstanding performance by using the Gale-Shapley algorithm, compared to random matching.

The method for matching between HAP and UAV in space-air-ground integrated network may be implemented in the form of applications or program instructions that can be executed through a variety of computer components, and recorded in computer-readable recording media. The computer-readable recording media may include program instructions, data files and data structures, alone or in combination.

The program instructions recorded in the computer-readable recording media may be specially designed and configured for the present disclosure and may be those known and available to persons having ordinary skill in the field of computer software.

Examples of the computer-readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure has been hereinabove described with reference to the embodiments, those skilled in the art will understand that various modifications and changes may be made thereto without departing from the spirit and scope of the present disclosure defined in the appended claims.

Through the application of the matching of the present disclosure in the field of communication, it is possible to develop communication technology to improve user experience, and it is a timely pioneering research at the time when HAP is not yet so much commercialized. Accordingly, it is expected that it will be usefully used as methods for building and operating network systems in the communication market, AAM market or the like. Additionally, government agencies can apply to HAP based national communication networks based on the present disclosure.

Detailed Description of Main Elements

1: Space-air-ground integrated network
10: Device for matching between HAP and UAV
110: UAV determination unit
130: Matching request unit
150: Matching determination unit
170: Priority comparison unit
190: Matching completion unit

What is claimed is:

1. A method for matching between high altitude platform (HAP) and unmanned aerial vehicle (UAV) in a space-air-ground integrated network, the method comprising:

determining if there is an unmatched UAV in the space-air-ground integrated network including at least one UAV and at least one HAP;

transmitting, by an n-th HAP having an unconnected antenna, a matching request to an unmatched m-th UAV in response to a presence of the unmatched UAV, wherein m is a natural number and n is a natural number;

determining if the m-th UAV is matched with another HAP;

comparing a priority of the n-th HAP with a priority of the matched HAP, in case of the m-th UAV being matched with another HAP; and matching the unconnected antenna of the n-th HAP with the m-th UAV, in case of the priority of the n-th HAP being higher than the priority of the matched HAP.

2. The method for matching between HAP and UAV in space-air-ground integrated network according to claim 1, wherein the method comprises repeatedly performing the steps until there is no unmatched UAV.

3. The method for matching between HAP and UAV in space-air-ground integrated network according to claim 2, wherein the method comprises terminating the steps upon completion of the matching of all the UAVs.

4. The method for matching between HAP and UAV in space-air-ground integrated network according to claim 1, further comprising:

matching the unconnected antenna of the n-th HAP with the m-th UAV, in case of the m-th UAV being not matched with another HAP.

5. The method for matching between HAP and UAV in space-air-ground integrated network according to claim 1, further comprising:

rejecting, by the m-th UAV, the matching of the n-th HAP, in case of the priority of the n-th HAP being equal to or lower than the priority of the matched HAP.

6. The method for matching between HAP and UAV in space-air-ground integrated network according to claim 1, wherein the matching of the n-th HAP with the m-th UAV further comprises terminating, by the m-th UAV, the connection with the matched HAP, in case of the priority of the n-th HAP being higher than the priority of the matched HAP.

7. The method for matching between HAP and UAV in space-air-ground integrated network according to claim 1, wherein the priority is set based on a path loss between the UAV and the HAP and a number of users served by the UAV.

8. A non-transitory computer-readable storage medium having recorded thereon a computer program for performing the method for matching between high altitude platform (HAP) and unmanned aerial vehicle (UAV) in space-air-ground integrated network according to claim 1.

9. A device for matching between high altitude platform (HAP) and unmanned aerial vehicle (UAV) in a space-air-ground integrated network, the device comprising:

a UAV determination unit configured to determine if there is an unmatched UAV in the space-air-ground integrated network including at least one UAV and at least one HAP;

a matching request unit configured to transmit a matching request to an unmatched m-th UAV in response to determining that there is an unmatched UAV, wherein m is a natural number;

a matching determination unit configured to determine if the m-th UAV is matched with another HAP;

a priority comparison unit configured to compare a priority of the HAP having requested the matching with a priority of the matched HAP, in case of the m-th UAV being matched with another HAP; and a matching completion unit configured to match an unconnected antenna of the HAP having requested the matching with the m-th UAV, in case of the priority of the HAP having requested the matching being higher than the priority of the matched HAP.

10. A non-transitory computer-readable storage medium having recorded thereon a computer program for performing the method for matching between high altitude platform (HAP) and unmanned aerial vehicle (UAV) in space-air-ground integrated network according to claim 2.

11. A non-transitory computer-readable storage medium having recorded thereon a computer program for performing the method for matching between high altitude platform (HAP) and unmanned aerial vehicle (UAV) in space-air-ground integrated network according to claim 3.

12. A non-transitory computer-readable storage medium having recorded thereon a computer program for performing the method for matching between high altitude platform (HAP) and unmanned aerial vehicle (UAV) in space-air-ground integrated network according to claim 4.

13. A non-transitory computer-readable storage medium having recorded thereon a computer program for performing the method for matching between high altitude platform (HAP) and unmanned aerial vehicle (UAV) in space-air-ground integrated network according to claim 5.

14. A non-transitory computer-readable storage medium having recorded thereon a computer program for performing the method for matching between high altitude platform (HAP) and unmanned aerial vehicle (UAV) in space-air-ground integrated network according to claim 6.

15. A non-transitory computer-readable storage medium having recorded thereon a computer program for performing the method for matching between high altitude platform (HAP) and unmanned aerial vehicle (UAV) in space-air-ground integrated network according to claim 7.

* * * * *